United States Patent
Jaiswal et al.

(10) Patent No.: US 9,628,885 B2
(45) Date of Patent: Apr. 18, 2017

(54) RADIO WITH WIRED REMOTE SWITCH FOR SMARTPHONE

(71) Applicant: GM GLOBAL TECHNOLOGY OPERATIONS LLC, Detroit, MI (US)

(72) Inventors: Pankaj Jaiswal, Bangalore (IN); Sudhir Sonnad, Bangalore (IN); Lohit Km, Bangalore (IN)

(73) Assignee: GM Global Technology Operations LLC, Detroit, MI (US)

( * ) Notice: Subject to any disclaimer, the term of this patent is extended or adjusted under 35 U.S.C. 154(b) by 7 days.

(21) Appl. No.: 14/819,017

(22) Filed: Aug. 5, 2015

(65) Prior Publication Data
US 2017/0041694 A1    Feb. 9, 2017

(51) Int. Cl.
H04R 1/06     (2006.01)
H04B 1/08     (2006.01)
H04W 88/02    (2009.01)
H04R 1/02     (2006.01)

(52) U.S. Cl.
CPC ............. *H04R 1/06* (2013.01); *H04B 1/082* (2013.01); *H04R 1/028* (2013.01); *H04W 88/02* (2013.01); *H04R 2420/09* (2013.01); *H04R 2499/11* (2013.01); *H04R 2499/13* (2013.01)

(58) Field of Classification Search
None
See application file for complete search history.

(56) References Cited

U.S. PATENT DOCUMENTS

| | | |
|---|---|---|
| 7,241,179 B2 | 7/2007 | Chennakeshu |
| 7,912,501 B2 | 3/2011 | Johnson et al. |
| 8,853,581 B2 | 10/2014 | Prest et al. |
| 2004/0175993 A1 | 9/2004 | Chennakeshu |
| 2007/0015537 A1 | 1/2007 | DeBiasio et al. |
| 2008/0317258 A1 | 12/2008 | Lindsay |
| 2010/0120366 A1 | 5/2010 | DeBiasio et al. |
| 2013/0103236 A1 | 4/2013 | Mehrgan |
| 2014/0206238 A1 | 7/2014 | Yen et al. |

OTHER PUBLICATIONS

"Make you own Hands Free car system for your phone." 2014 Autodesk, Inc., 12 pages.
"Wired audio headset specification (v1.1)". https://source.android.com/accessories/headset-spec.html, 5 pages.

*Primary Examiner* — Paul Huber
(74) *Attorney, Agent, or Firm* — Dierker & Kavanaugh, P.C.

(57) ABSTRACT

A radio includes controls operatively disposed on a face panel. A 3.5 millimeter audio jack is disposed on or through the face panel. The audio jack has four contacts including a microphone contact. A microphone is disposed on or in the face panel to transduce sound received at the face panel. The microphone is electrically connected via a microphone output circuit to the microphone contact. A normally open switch has a switch actuator button disposed on the face panel. The switch is to connect the microphone output circuit to an electrical ground when the switch is closed. The audio jack is to electrically connect the radio to circuits of a smartphone including a smartphone left speaker output circuit, a smartphone right speaker output circuit, a smartphone ground circuit and a smartphone microphone input circuit.

7 Claims, 7 Drawing Sheets

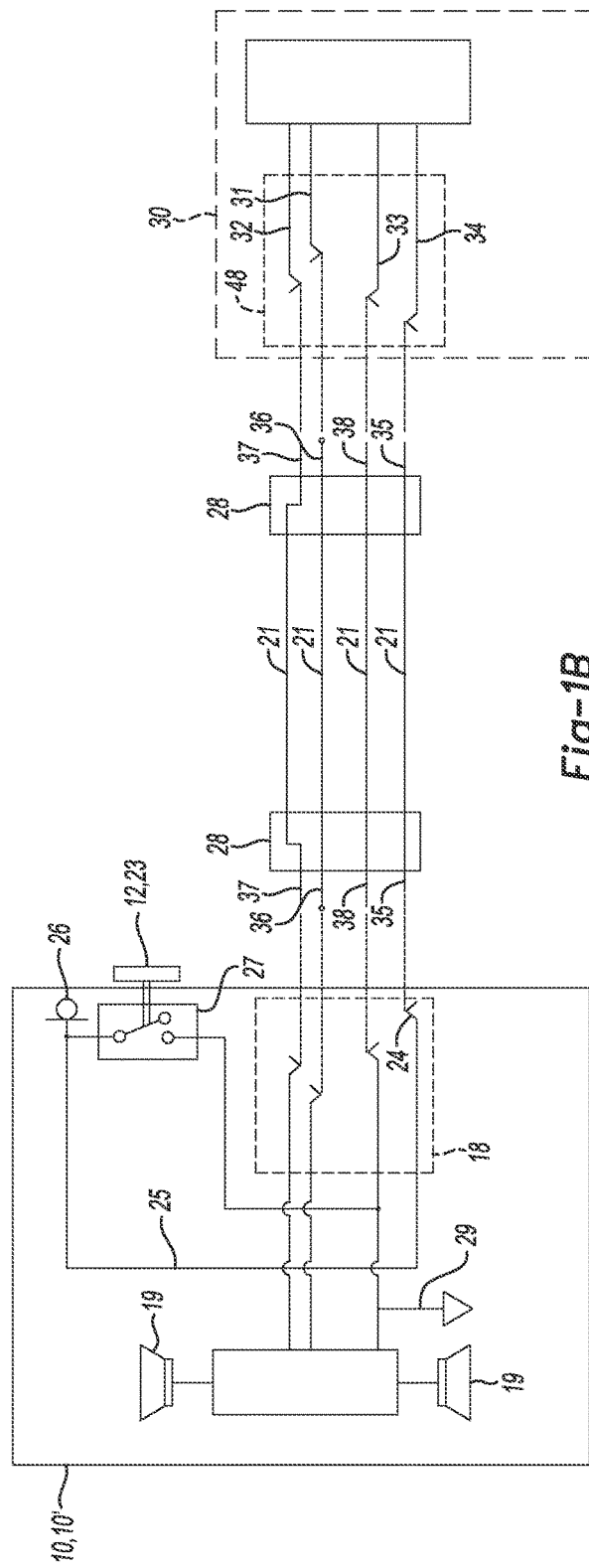
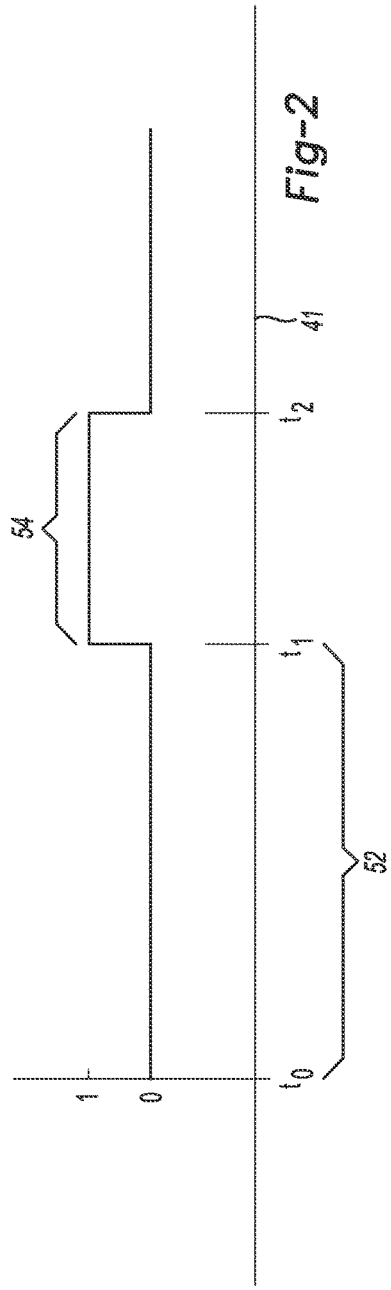

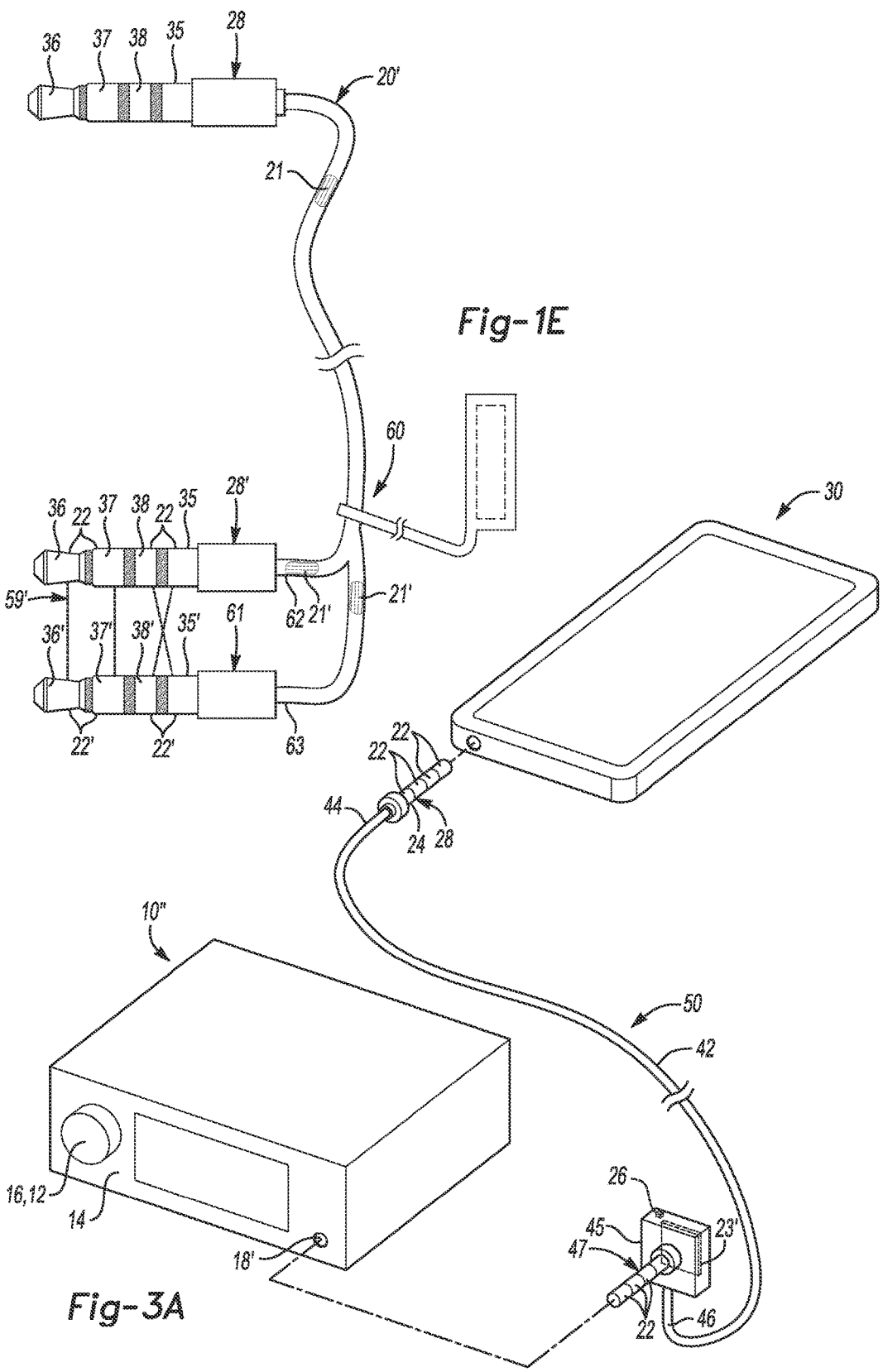

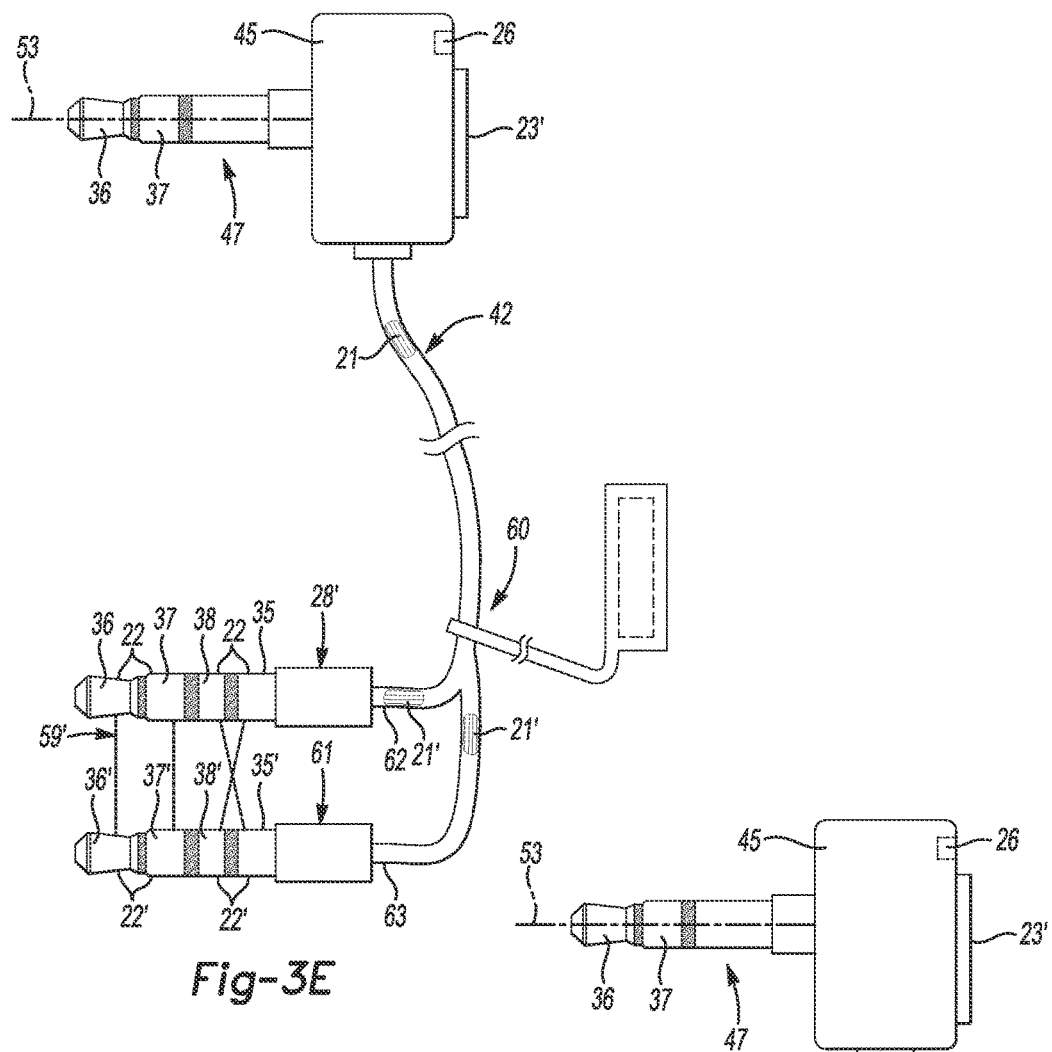
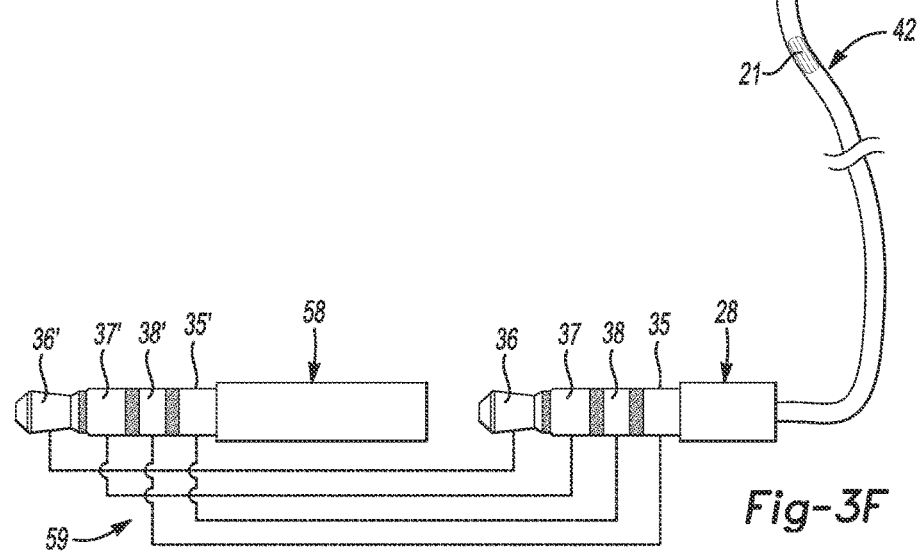

RADIO WITH WIRED REMOTE SWITCH FOR SMARTPHONE

BACKGROUND

Some existing radios use Bluetooth wireless technology to enable communication between the radio and a smartphone. The wireless communication allows music stored on the smartphone or streamed through the smartphone, to be played through the radio. Further, the wireless communication allows hands free use of the telephone via the radio. For example, the user of the radio may hear the other party of a telephone call through the speakers that normally play the entertainment audio received by the radio. Such hands-free telephone operation has been integrated into vehicles, allowing an occupant of the vehicle to carry on a telephone conversation by speaking into a microphone mounted in the headliner, the dashboard, or the steering wheel, and hearing the other party through the radio speakers. The telephone communication is handled by the smartphone; and the local communication is wireless between the radio and the smartphone using Bluetooth technology.

SUMMARY

A radio includes controls operatively disposed on a face panel. A 3.5 millimeter audio jack is disposed on or through the face panel. The audio jack has four contacts including a microphone contact. A microphone is disposed on or in the face panel to transduce sound received at the face panel. The microphone is electrically connected via a microphone output circuit to the microphone contact. A normally open switch has a switch actuator button disposed on the face panel. The switch is to connect the microphone output circuit to an electrical ground when the switch is closed. The audio jack is to electrically connect the radio to circuits of a smartphone including a left speaker output circuit, a right speaker output circuit, a ground circuit and a microphone input circuit.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIG. 1B is an electrical schematic drawing depicting an example of a radio for connection to an auxiliary cable and a smartphone according to the present disclosure

FIG. 1E is a semi-schematic side view depicting an example of a splitter cable having a primary audio plug and a secondary audio plug to make the radio compatible with smartphones that have different assignments for contacts in a smartphone headset jack;

FIG. 2 is a graphical representation of a switch activation in a time domain according to the present disclosure;

FIG. 3A is a semi-schematic drawing depicting an example of a combination auxiliary cable and switch for connection to a radio and a smartphone according to the present disclosure;

FIG. 3E is a semi-schematic side view depicting an example of a combination auxiliary cable and switch with an adapter plug according to the present disclosure; and FIG. 3F is a semi-schematic side view depicting an example of a combination auxiliary cable and switch with a splitter cable having a primary audio plug and a secondary audio plug to make the radio compatible with smartphones that have different assignments for contacts in a smartphone headset jack.

DETAILED DESCRIPTION

The present disclosure relates to a radio with a wired link to a smartphone. Existing radios have wireless, short range communication with a smartphone. To establish Bluetooth communication between two devices, an operator follows a "pairing" procedure. Pairing procedures authenticate the devices to allow more secure communication. The Bluetooth pairing procedure can be intimidating to operators. Further, power consumption of Bluetooth operation may reduce the operational time of a smartphone between recharging the smartphone battery.

The radio of the present disclosure has a jack for establishing a simple, wired link between the radio and the smartphone. The radio will have many of the features of a Bluetooth enabled radio; however, the radio of the present disclosure can be produced at a low cost without the nuisance that may be associated with Bluetooth pairing.

Figure 1A:
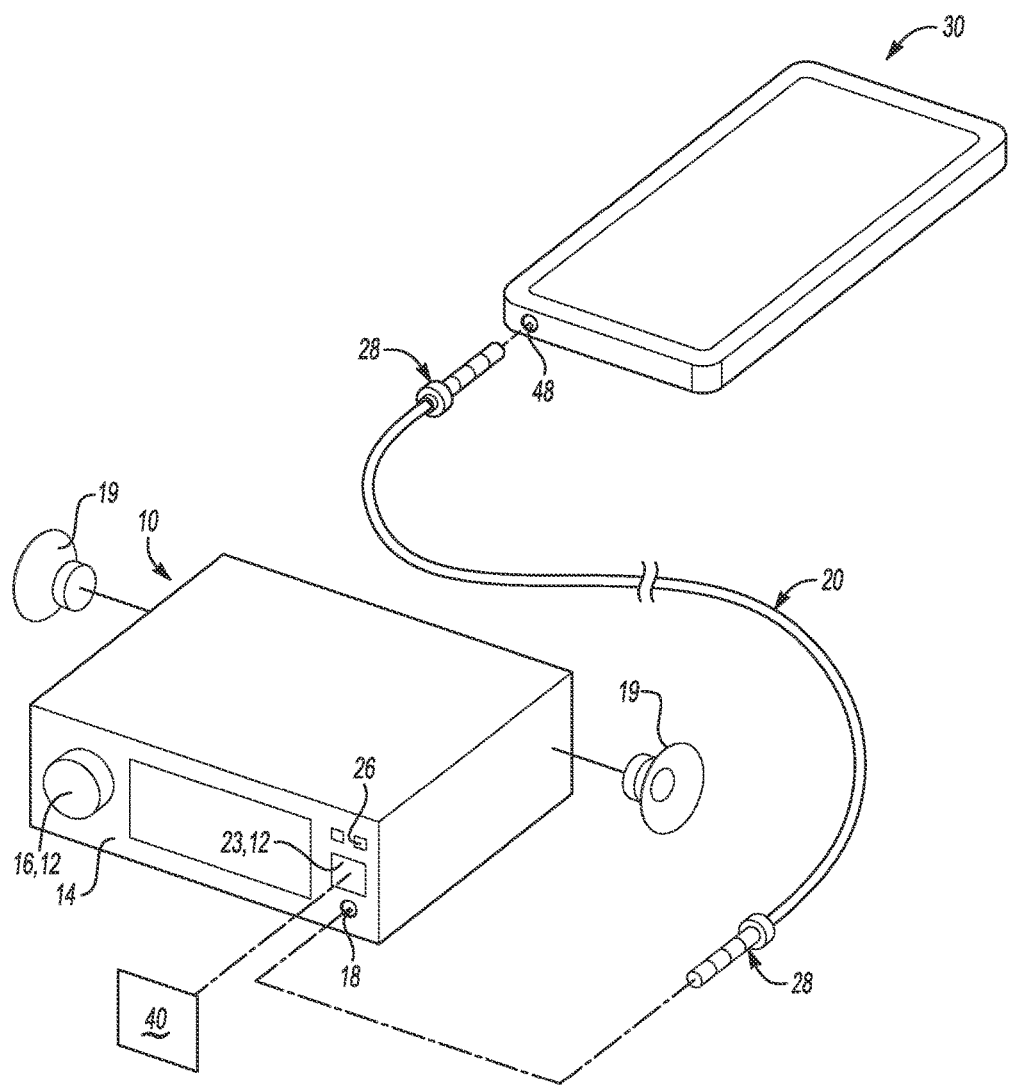
FIG. 1A is a semi-schematic drawing showing an example of a radio for connection to an auxiliary cable and a smartphone according to the present disclosure.

FIG. 1A is a semi-schematic drawing showing an example of a radio 10 for connection to an auxiliary cable 20 and a smartphone 30 according to the present disclosure. The radio 10 has controls 12 operatively disposed on a face panel 14. The controls may include a button, knob 16, switch, touch screen or graphical user interface for configuring the radio 10. For example, a knob may be rotated to tune the radio 10 to a particular frequency for reception of a frequency modulated (FM) radio broadcast. The radio may include a receiver to receive AM (amplitude modulation), FM, satellite or other wireless electromagnetic signals. The radio may have the ability to play pre-recorded audio stored on CD (compact disk), magnetic tape, or digitally stored audio for example on flash memory via USB communication with the radio. In an example, the radio 10 may be powered via a dedicated connection to a vehicle power bus. As such, the radio 10 may be a factory-installed or aftermarket vehicle radio. In another example, however, the radio 10' may be a table-top radio 10' to provide improved sound quality over the speaker phone capability built into the smartphone. The table-top radio may be powered by building power, for example 120 VAC using a AC/DC power adapter. As disclosed herein, the radio is not a hand-held mobile radio, walkie-talkie, wireless telephone, or cordless telephone.

In the example depicted in FIG. 1A, a 3.5 mm (millimeter) audio jack 18 is disposed on or through the face panel 14. The audio jack 18 has four contacts 22 including a microphone contact 24. The 3.5 mm audio jack 18 is to receive a complementary 3.5 mm audio plug 28, which may also be known as a "mini" connector. The mini connector with four contacts 22 may also be known as a TRRS (Tip, Ring, Ring, Sleeve) connector.

In the example depicted in FIG. 1A, a microphone 26 is disposed on or in the face panel 14 to transduce sound received at the face panel 14. The microphone 26 is electrically connected via a microphone output circuit 25 to the microphone contact 24 (see FIG. 1B). A normally open switch 27 having a switch actuator button 23 is disposed on the face panel 14. The normally open switch 27 is to connect the microphone output circuit 25 to an electrical ground 29 when the normally open switch 27 is closed. The audio jack 18 is to electrically connect the radio 10 to circuits of the smartphone 30 including a smartphone left speaker output circuit 31, a smartphone right speaker output circuit 32, a smartphone ground circuit 33, and a smartphone microphone input circuit 34. As depicted in FIGS. 1A and 1B, the smartphone 30 may have a smartphone headset jack 48 for connecting to the smartphone left speaker output circuit 31, smartphone right speaker output circuit 32, smartphone ground circuit 33, and smartphone microphone input circuit 34. The smartphone headset jack 48 may be a 3.5 mm audio jack.

Figure 1C:
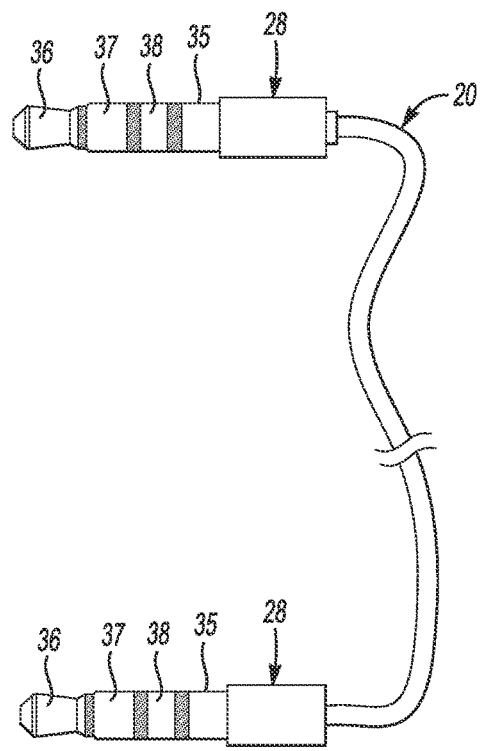
FIG. 1C is a semi-schematic side view depicting a prior-art auxiliary cable according to the present disclosure.

As depicted in FIG. 1B, the contacts 22 of the audio jack 18 must be compatible with the corresponding contacts on the audio plug 28. In the example depicted in FIG. 1A, 1B, and 1C, the microphone output circuit 25 is connected to the smartphone microphone input circuit 34 via the "sleeve" contact 35 of the audio plug 28. In the example shown in FIG. 1A, 1B, and 1C, the other contacts of the audio plug 28 are assigned as follows: Tip 36, right speaker; first ring 37, left speaker; second ring 38, ground. The auxiliary cable 20 depicted in FIG. 1C is a 4 contact auxiliary cable. The auxiliary conductors 21 connect the Tip 36, first ring 37, second ring 38, and sleeve 35 to the same (tip, first ring, second ring, sleeve) contact on the opposite audio plug 28. The arrangement of conductors and contacts in the example depicted in FIGS. 1A, 1B, and 1C, makes the radio of the present disclosure compatible with many smartphones currently for sale, including Apple's iPhone line, HTC devices, and some Samsung, Nokia and Sony smartphones. Some other smartphones, however, have different contact assignments.

Figure 1D:
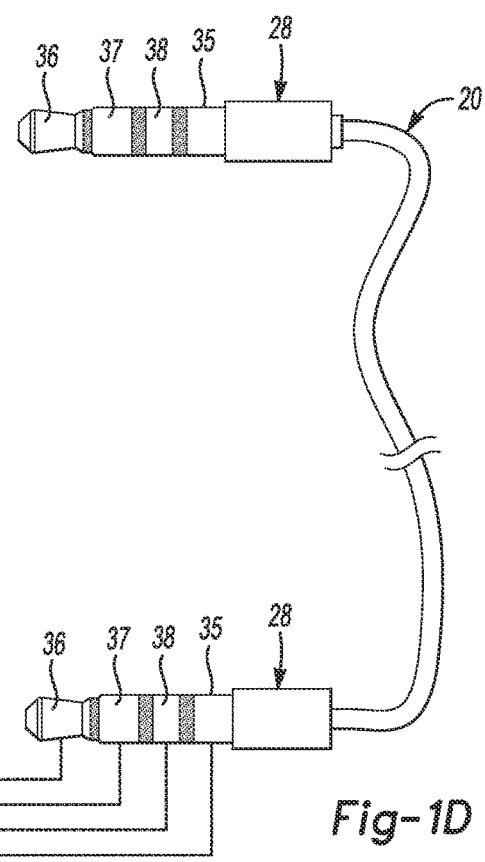
FIG. 1D is a semi-schematic side view depicting an adapter plug according to the present disclosure, to connect to the auxiliary cable depicted in FIG. 1C.

As depicted in FIG. 1D, an adapter plug 58 may be connected to one of the audio plugs 28 to make the radio 10 compatible with smartphones that have different assignments for the contacts in the smartphone headset jack 48. For example, in some, particularly older model smartphones, the second ring 38' may be assigned to the smartphone microphone input circuit 34, and the sleeve 35' may be assigned to the smartphone ground circuit 33. The contacts in the adapter plug 58 for use with such an older model smartphone would be as follows: tip 36 to tip 36' (right speaker); first ring 37 to first ring 37' (left speaker); second ring 38 to sleeve 35' (ground); and sleeve 35 to second ring 38'. The dashed lines 59 indicate the assignment of contacts on the adapter plug 58 relative to the contacts on the audio plug 28. In examples of the present disclosure, neither the radio 10 nor the smartphone 30 is permanently damaged by insertion of an audio plug 28 with incompatible contact assignments.

The example of the auxiliary cable 20' depicted in FIG. 1E is similar to the auxiliary cable 20 depicted in FIG. 1C except as described below. The auxiliary cable 20' is a splitter cable 60 having a primary branch 62 and a secondary branch 63. The primary branch 62 and the secondary branch 63 each have four branch conductors 21' connected to the four auxiliary conductors 21. A primary audio plug 28' is disposed at the end of the primary branch 62. The primary audio plug 28' is another instance of the audio plug 28 with the same contact assignments. A secondary audio plug 61 is disposed at the end of the secondary branch 63. The contacts 22' are assigned differently from the contacts 22 of the primary audio plug 28' to make the radio 10 compatible with smartphones that have different assignments for the contacts in the smartphone headset jack 48. (See FIG. 1A.) For example, the second ring 38' may be assigned to the smartphone microphone input circuit 34, and the sleeve 35' may be assigned to the smartphone ground circuit 33. The contacts in the secondary audio plug 61 for use with such an older model smartphone would be as follows: tip 36' (right speaker); first ring 37' (left speaker); second ring 38'(microphone); and sleeve 35' (ground). The dashed lines 59' indicate the assignment of contacts 22' on the secondary audio plug 61 relative to the contacts 22 on the primary audio plug 28'. An insulated cap 64 may be attached to the auxiliary cable 20' to be installable over the primary audio plug 28' or the secondary audio plug 61 to prevent short circuits and electrical noise from incidental contact with nearby conductive material by the primary audio plug 28' or the secondary audio plug 61 that is not inserted into the smartphone headset jack 48.

In the example depicted in FIGS. 1A, 1B, 1C, 1D and 1E, the radio 10 may have a selectable "aux" mode for selectably receiving and amplifying auxiliary audio signals that are input through the audio jack 18. In response to a pressing of the switch actuator button 23, the radio is switchable from an audio source other than the audio jack 18 to the auxiliary audio signals that are input through the audio jack 18. In further response to the pressing of the switch actuator button 23, the radio 10, via signals conducted through the audio jack 18, is to cause the smartphone 30 to answer a call using the microphone 26 and a set of speakers 19 operatively connected to the radio 10. The radio 10 may be to amplify audio signals from the smartphone 30 for output to speakers 19 electrically connected to the radio 10. The normally open switch 27 is to select a selected operative state from a plurality of operative states of the smartphone 30. In a non-limitative example, the plurality of operative states of the smartphone 30 may include a telephone mode and an audio entertainment mode. The plurality of operative state of the smartphone 30 may include any operative state of the smartphone. For example, the radio 10 may be in the aux mode, playing music that is stored on the smartphone 30 and transmitted from the smartphone 30 to the radio 10 by the auxiliary cable 20. A ringtone may be played through the set of speakers 19 to indicate that another party is attempting to make a wireless telephone connection with the smartphone 30. In response to pressing the switch actuator button 23, the smartphone 30 stops playing or pauses the audio entertainment and answers the call. The call is heard through the set of speakers 19 rather than the speaker built-into the smartphone 30. The microphone 26 is connected to the smartphone 30 for use during the call.

The selection of the operative state of the smartphone 30 may be responsive to a temporal pattern of opening and closing of the normally open switch 27. FIG. 2 illustrates an example of a temporal pattern of opening and closing of the normally open switch 27. FIG. 2 is a graphical representation of a switch activation in a time domain according to the present disclosure. The ordinate axis 49 indicates a discrete state of the normally open switch 27. The first state is at reference level 0, and the second state is at reference level 1 in FIG. 2. In examples of the present disclosure, the first state may correspond to the normally open switch 27 being open, and the second state may correspond to the normally open switch 27 being closed. In other examples, the first state may correspond to the normally open switch 27 being closed, and the second state may correspond to the normally open switch 27 being open. FIG. 2 indicates that the normally open switch 27 is in the second state between $t_1$ and $t_2$. In an example, the selection of the operative state of the smartphone 30 may mean switching the smartphone 30 to a telephone mode. The temporal pattern may be "pressing the switch actuator button 23 for at least 0.5 second then releasing the switch actuator button without pressing the switch actuator button 23 again for at least 0.25 seconds." Another temporal pattern may be some form of pressing the switch actuator button 23 two times in rapid succession.

The following narrative describes operation of the radio 10 with a smartphone 30. A user 40 connects the smartphone 30 to the radio 10 by plugging the auxiliary cable 20 into the audio jack 18 on the radio 10 and the smartphone headset jack 48. The user 40 can listen to music played by the smartphone 30 on the set of speakers 19 connected to the radio 10. The user 40 may answer a call by pressing the switch actuator button 23 on the radio 10. The user 40 talks through the microphone 26 that is integrated in the radio 10, and listens through the set of speakers 19 connected to the radio 10. The radio 10 switches to a call mode in response to a single press of the switch actuator button 23 from any mode. For example, the user 40 may be using the radio 10 conventionally, listening to an FM broadcast received by the radio in an FM radio mode. By pressing the switch actuator button 23 on the radio 10 once, the radio 10 switches out of the FM radio mode, thereby silencing the FM broadcast that had been received and had been playing. In further response to the same pressing of the switch actuator button 23 on the radio 10, the radio 10 enters the call mode. By pressing the switch actuator button 23, the user 40 can answer an in-coming call, place a call to a last-dialed number, put a current call on hold, and resume the call placed on hold. By pressing the switch actuator button 23, the user 40 can pause/play audio playing through the smartphone 30 on the set of speakers 19 connected to the radio 10.

The response of the smartphone 30 to a temporal pattern of opening and closing of the normally open switch 27 may depend on a then-current mode of the smartphone 30. For example, if the smartphone 30 is in the call mode, the user 40 may hang-up (disconnect) an ongoing call by pressing the switch actuator button 23 for a relatively long duration (e.g., about 2 seconds). If the smartphone 30 is playing a song from a playlist, pressing the switch actuator button 23 for the relatively long duration (e.g., about 2 seconds) may cause the smartphone 30 to advance to a next song in the playlist.

In an example, there may be a plurality of normally open switches 27 operatively connected to a resistive ladder network. A plurality of switch actuator buttons 23 may be operatively connected to respective switches in the plurality of normally open switches 27. Pressing a particular switch actuator button 23 in the plurality of switch actuator buttons 23 causes a selection of a corresponding resistance in the resistive ladder network. In such an example, the selection of the operative state of the smartphone 30 may be responsive to the resistance of the resistive ladder network.

FIG. 3A is a semi-schematic drawing depicting an example of a combination auxiliary cable and switch 50 for connection to a radio 10" and a smartphone 30 according to the present disclosure. The combination auxiliary cable and switch 50 includes a first 3.5 mm audio plug 28 having four contacts 22 including a microphone contact 24. The combination auxiliary cable and switch 50 includes an auxiliary cable portion 42 having four auxiliary conductors 21 including a microphone conductor 43. The four auxiliary conductors 21 are connected to the four contacts 22 at a proximal end 44 of the auxiliary cable portion 42. A housing 45 is disposed at a distal end 46 of the auxiliary cable portion 42 opposite the proximal end 44. A second 3.5 mm audio plug 47 is disposed on the housing 45. The second 3.5 mm audio plug 47 has no more than three contacts 22.

A microphone 26 is disposed on or in the housing 45 to transduce sound received at the housing 45. The microphone 26 is electrically connected via the microphone conductor 43 to the microphone contact 24. A normally open switch 27' is to be actuated by a switch actuator button 23'. Both the normally open switch 27' and the switch actuator button 23' are disposed on the housing 45. The switch 27' is to connect the microphone conductor 43 to an electrical ground conductor 51 when the switch 27' is closed. The combination auxiliary cable and switch 50 is to electrically connect the radio 10" to circuits of a smartphone 30 including a left speaker output circuit 31, a right speaker output circuit 32, and a ground circuit 33. The microphone 26 is to electrically connect to a microphone input circuit 34 of the smartphone 30 via the microphone contact 24.

Similar to the radio 10, above, the radio 10" may be powered via a dedicated connection to a vehicle power bus. As such, the radio 10" may be a factory-installed or aftermarket vehicle radio.

In response to a pressing of the switch actuator button 23', the combination auxiliary cable and switch 50, via signals conducted through the smartphone headset jack 48, is to cause the smartphone 30 to answer a call using the microphone 26 and the set of speakers 19 operatively connected to the radio 10". The radio 10" may have a selectable auxiliary mode for selectably receiving and amplifying auxiliary audio signals that are input through an audio jack 18' complementary to the second 3.5 mm audio plug 47. In the auxiliary mode, the radio 10" is to amplify audio signals conducted from the smartphone 30 via the auxiliary cable portion 42 through the first audio plug 28 and the second 3.5 mm audio plug 47 for output to speakers 19 electrically connected to the radio 10". The switch 27' is to select a selected operative state from a plurality of operative states of the smartphone 30.

In examples of the present disclosure, the plurality of operative states of the smartphone 30 may include a telephone mode and an audio entertainment mode. A selection of the operative state of the smartphone 30 may be responsive to a temporal pattern of opening and closing of the switch 27'. In examples, the temporal pattern of opening and closing of the switch 27' may include the switch 27' being continuously open for a first period of time 52, and the switch 27' being continuously closed for a second period of time 54, for example, at least 20 milliseconds, immediately subsequent to the first period of time 52. (See FIG. 2.)

Figure 3B:
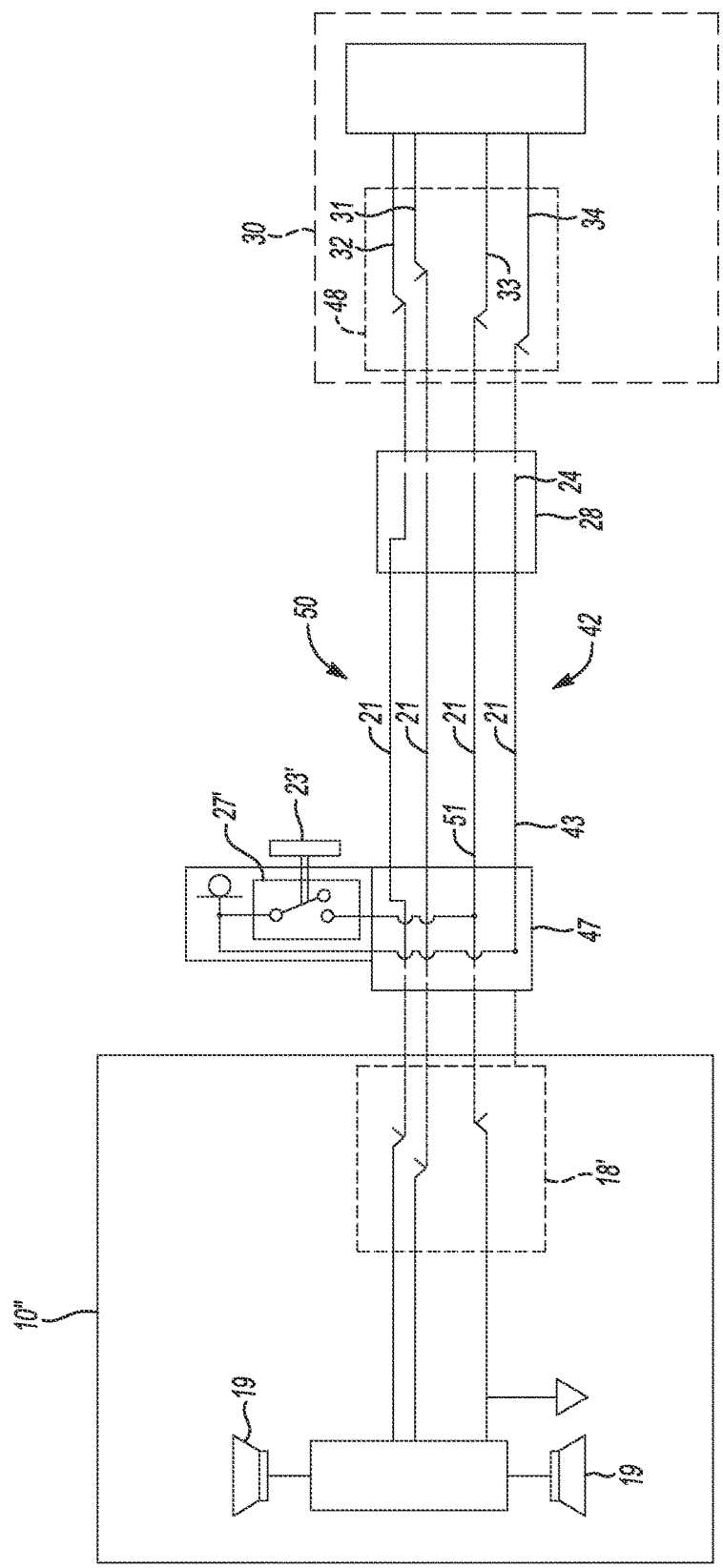
FIG. 3B is an electrical schematic drawing depicting an example of a combination auxiliary cable and switch for connection to a radio and a smartphone according to the present disclosure.

In the example depicted in FIG. 3B, the no more than three contacts define a common cylindrical axis 53 of the second 3.5 mm audio plug 47. The switch actuator button 23' is translatable relative to the housing 45 in a direction parallel to the second 3.5 mm audio plug 47. An actuation of the switch 27' via the switch actuator button 23' urges the second 3.5 mm audio plug 47 into operative engagement with the corresponding 3.5 mm audio jack 18' disposed on the face panel 14 of the radio 10".

As depicted in FIG. 3E, an adapter plug 58 may be removably installable on the first 3.5 mm audio plug 28 to make the radio 10 compatible with smartphones that have different assignments for the contacts in the smartphone headset jack 48. For example, in some, particularly older model smartphones, the second ring 38' may be assigned to the smartphone microphone input circuit 34, and the sleeve 35' may be assigned to the smartphone ground circuit 33. The contacts in the adapter plug 58 for use with such an older model smartphone would be as follows: main tip 36 to adapter tip 36' (right speaker); main first ring 37 to adapter first ring 37' (left speaker); main second ring 38 to adapter sleeve 35' (ground); and main sleeve 35 to adapter second ring 38'. The dashed lines 59 indicate the assignment of contacts on the adapter plug 58 relative to the contacts on the audio plug 28.

Figure 3C:
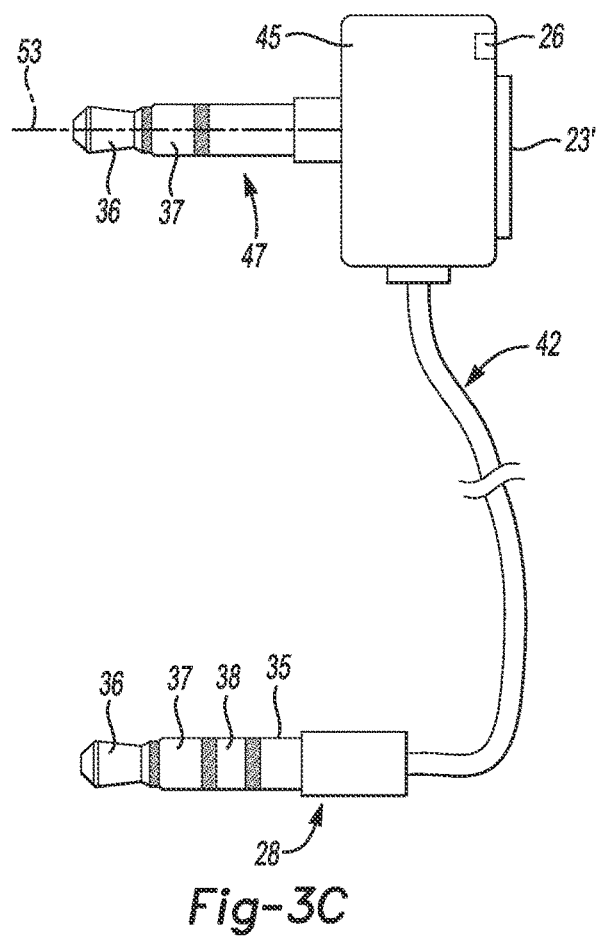
FIG. 3C is a semi-schematic side view depicting an example of a combination auxiliary cable and switch according to the present disclosure.
Figure 3D:
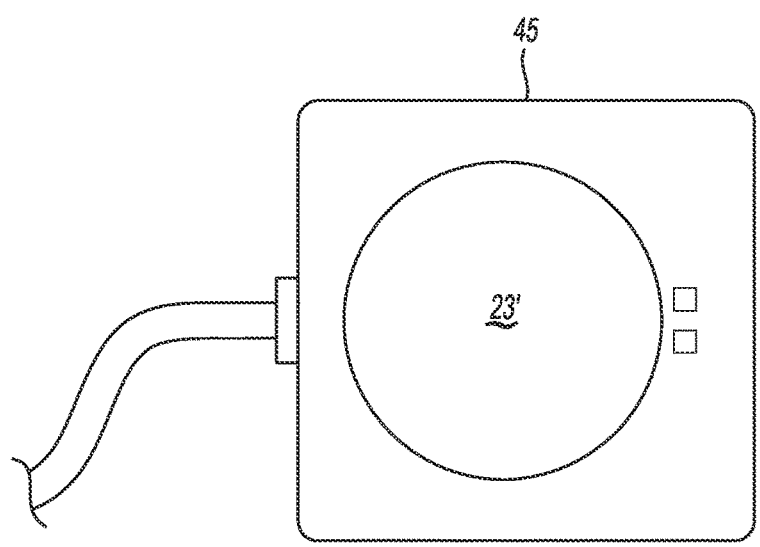
FIG. 3D is a semi-schematic front view depicting the example of the housing and the switch actuator button shown in FIG. 3C.

The example of the combination auxiliary cable and switch 50' depicted in FIG. 3F is similar to the auxiliary cable and switch 50 depicted in FIG. 3C except as described below. The auxiliary cable 20' is a splitter cable 60 having a primary branch 62 and a secondary branch 63. The primary branch 62 and the secondary branch 63 each have four branch conductors 21' connected to the four auxiliary conductors 21. A primary audio plug 28' is disposed at the end of the primary branch 62. The primary audio plug 28' is another instance of the audio plug 28 with the same contact assignments. A secondary audio plug 61 is disposed at the end of the secondary branch 63. The contacts 22' are assigned differently from the contacts 22 of the primary audio plug 28' to make the radio 10 compatible with smartphones that have different assignments for the contacts in the smartphone headset jack 48. (See FIG. 1A.) For example, the second ring 38' may be assigned to the smartphone microphone input circuit 34, and the sleeve 35' may be assigned to the smartphone ground circuit 33. The contacts in the secondary audio plug 61 for use with such an older model smartphone would be as follows: secondary tip 36' (right speaker); secondary first-ring 37' (left speaker); secondary second-ring 38' (microphone); and secondary sleeve 35' (ground). The dashed lines 59' indicate the assignment of contacts 22' on the secondary audio plug 61 relative to the contacts 22 on the primary audio plug 28'. A first tip contact 36 on the first 3.5 mm audio plug 28 is electrically connected via the branch conductors 21' to a secondary tip contact 36' on the secondary audio plug 61. A first first-ring contact 37 on the first 3.5 mm audio plug 28 is electrically connected via the branch conductors 21' to a secondary first-ring contact 37' on the secondary audio plug 61. A first second-ring contact 38 on the first 3.5 mm audio plug 28 is electrically connected via the branch conductors 21' to a secondary sleeve contact 35' on the secondary audio plug 61. A first sleeve contact 35 on the first 3.5 mm audio plug 28 is electrically connected via the branch conductors 21 to a secondary second-ring contact 38' on the secondary audio plug 61. An insulated cap 64 may be attached to the auxiliary cable 20' to be installable over the first 3.5 mm audio plug 28 or the secondary audio plug 61 to prevent short circuits and electrical noise from incidental contact with nearby conductive material by the first 3.5 mm audio plug 28 or the secondary audio plug 61 that is not inserted into the smartphone headset jack 48.

It is to be understood that when "about" is utilized to describe a value, this is meant to encompass minor variations (up to +/−10%) from the stated value.

In describing and claiming the examples disclosed herein, the singular forms "a", "an", and "the" include plural referents unless the context clearly dictates otherwise.

It is to be understood that the terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween).

Furthermore, reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

Although the present disclosure has been described with reference to vehicles, it is to be understood that the disclosed method may be applied to static applications including, for example, IC (internal combustion) engine-powered electric generators for providing electric power.

While several examples have been described in detail, it is to be understood that the disclosed examples may be modified. Therefore, the foregoing description is to be considered non-limiting.

What is claimed is:

1. A radio, comprising:
   controls operatively disposed on a face panel;
   a 3.5 millimeter audio jack disposed on or through the face panel, the audio jack having four contacts including a microphone contact;
   a microphone disposed on or in the face panel to transduce sound received at the face panel, the microphone electrically connected via a microphone output circuit to the microphone contact; and
   a normally open switch having a switch actuator button disposed on the face panel, the normally open switch to connect the microphone output circuit to an electrical ground when the normally open switch is closed wherein the audio jack is to electrically connect the radio to circuits of a smartphone including a smartphone left speaker output circuit, a smartphone right speaker output circuit, a smartphone ground circuit and a smartphone microphone input circuit.

2. The radio as defined in claim 1 wherein the radio is powered via a dedicated connection to a vehicle power bus.

3. The radio as defined in claim 1 wherein the radio has a selectable aux mode for selectably receiving and amplifying auxiliary audio signals that are input through the audio jack.

4. The radio as defined in claim 3 wherein, in response to a pressing of the switch actuator button, i) the radio is switchable from an audio source other than the audio jack to the auxiliary audio signals, and ii) the radio, via signals conducted through the audio jack, is to cause the smartphone to answer a call using the microphone and a set of speakers operatively connected to the radio.

5. The radio as defined in claim 1 wherein:
the radio is to amplify audio signals from the smartphone for output to speakers electrically connected to the radio; and
the normally open switch is to select a selected operative state from a plurality of operative states of the smartphone.

6. The radio as defined in claim 5 wherein the plurality of operative states of the smartphone includes a telephone mode and an audio entertainment mode.

7. The radio as defined in claim 5 wherein a selection of the operative state of the smartphone is responsive to a temporal pattern of opening and closing of the normally open switch.

* * * * *